US011662209B2

(12) United States Patent
Hu et al.

(10) Patent No.: US 11,662,209 B2
(45) Date of Patent: May 30, 2023

(54) SHORT ARC INITIAL ORBIT DETERMINING METHOD BASED ON GAUSS SOLUTION CLUSTER

(71) Applicant: HUAZHONG UNIVERSITY OF SCIENCE AND TECHNOLOGY, Hubei (CN)

(72) Inventors: Jing Hu, Hubei (CN); Binzhe Li, Hubei (CN); Li Fang, Hubei (CN); Tao Xiong, Hubei (CN); Xiang Gao, Hubei (CN); Susu Kang, Hubei (CN); Kan Jiang, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 371 days.

(21) Appl. No.: 16/762,505

(22) PCT Filed: Sep. 23, 2019

(86) PCT No.: PCT/CN2019/107186
§ 371 (c)(1),
(2) Date: May 8, 2020

(87) PCT Pub. No.: WO2020/186719
PCT Pub. Date: Sep. 24, 2020

(65) Prior Publication Data
US 2021/0199439 A1 Jul. 1, 2021

(30) Foreign Application Priority Data
Mar. 19, 2019 (CN) .......................... 201910207587.6

(51) Int. Cl.
*G01C 21/24* (2006.01)
*G01C 21/02* (2006.01)
(Continued)

(52) U.S. Cl.
CPC ............. *G01C 21/20* (2013.01); *G01C 21/02* (2013.01)

(58) Field of Classification Search
CPC ........ G01C 21/20; G01C 21/02; G01C 21/24; B64G 1/242; B64G 3/00
(Continued)

(56) References Cited

U.S. PATENT DOCUMENTS 3,290,933 A * 12/1966 Lillestrand .............. G01S 3/782
250/203.1
2006/0238860 A1* 10/2006 Baun ...................... G02B 23/16
359/429
(Continued)

FOREIGN PATENT DOCUMENTS

CN 104794268 A * 7/2015

*Primary Examiner* — Nga X Nguyen
(74) *Attorney, Agent, or Firm* — JCIRPNET

(57) ABSTRACT

The invention discloses a preferable short arc initial orbit determining method based on Gauss solution cluster, and belongs to the astrodynamics field, including: grouping the observation data, using Gauss method to obtain the target state vector at the corresponding time point for each group of data, forming a solution set of preliminary estimation; dividing the solution set of preliminary estimation into a position component vector solution set and a velocity component vector solution set for clustering to obtain a position component vector solution cluster and a velocity component vector solution cluster; based on the position component vector solution cluster and the velocity component vector solution cluster, generating a two-dimensional trajectory solution set; evaluating each of the two-dimensional trajectories by using a trajectory optimal method, calculating the number of root of orbits corresponding to the optimal two-dimensional trajectory, thereby completing determination of initial orbit.

16 Claims, 7 Drawing Sheets

(51) Int. Cl.
G01C 21/20 (2006.01)
B64G 3/00 (2006.01)

(58) Field of Classification Search
USPC .......................................................... 701/531
See application file for complete search history.

(56) References Cited

U.S. PATENT DOCUMENTS

2006/0244621 A1* 11/2006 Lemp ..................... G01C 21/02
340/815.4
2012/0093359 A1* 4/2012 Kurien ................... G06V 10/95
382/103

* cited by examiner

SHORT ARC INITIAL ORBIT DETERMINING METHOD BASED ON GAUSS SOLUTION CLUSTER

CROSS-REFERENCE TO RELATED APPLICATION

This application is a 371 of international application of PCT application serial no. PCT/CN2019/107186, filed on Sep. 23, 2019, which claims the priority benefit of China application no. 201910207587.6, filed on Mar. 19, 2019. The entirety of each of the above mentioned patent applications is hereby incorporated by reference herein and made a part of this specification.

BACKGROUND

Technical Field

The disclosure belongs to the field of astrodynamics, and more particularly relates to a preferable short arc initial orbit determining method based on Gauss solution cluster.

Description of Related Art

With the development of astrodynamics, the initial orbit determining technology has become one of the most important technologies nowadays. Conventional methods for determining the initial orbit are to calculate the orbits of satellites or space debris through Earth observation data. These methods normally adopt the equation of motions for solving problems between two objects. Due to the short observation time and less available data of the space-based observation system, the conventional method of determining the initial orbit is not suitable for space-based observation data. In addition, if the curvature of the track to be detected is too small, the initial orbit may not be determined.

The current methods for determining the initial orbit include: conventional Laplace method, Gauss method and related improved algorithms. The drawbacks of the conventional Gauss method are that too many roots are obtained after solving higher-order polynomials and need to be filtered; the improved Gauss method can avoid the problem of double roots, but it is necessary to choose a suitable initial value, otherwise the algorithm is calculated in multiple times and diverged or eventually a trivial solution or a wrong solution is obtained.

Current research data shows that there are many methods with excellent performance in the initial orbit determining field based on Earth observation data, and in the initial orbit determining field based on space-based observation data, the requirement for the time intervals of algorithms in related research is relatively long, and therefore the applicability of such short arc initial orbit determining methods is not high. The method of the disclosure can solve the problem of multiple root existing in the conventional Gauss method, and is applicable for the short arc initial orbit determining task.

SUMMARY

To overcome the shortcomings of the related art, the purpose of the present disclosure is to solve the technical problems of current technology, which has large errors in short arc initial orbit determining method based on conventional Gauss method and it is difficult to effectively choose a solution from multiple sets of solutions.

To achieve the above purpose, first of all, an embodiment of the present disclosure provides a preferable short arc initial orbit determining method based on a Gauss solution cluster, and the method includes the following steps:

S1. The observation data is divided into groups, and for each group of data, the Gauss method is adopted to find the target state vector for the corresponding time point to form a solution set of preliminary estimation.

S2. The solution set of preliminary estimation is divided into a position component vector solution set and a velocity component vector solution set, which are respectively clustered to obtain a position component vector solution cluster and a velocity component vector solution cluster.

S3. A two-dimensional trajectory solution set is generated based on the position component vector solution cluster and the velocity component vector solution cluster.

S4. The trajectory optimization method is adopted to evaluate each two-dimensional trajectory, calculate the number of roots of orbit corresponding to the optimal two-dimensional trajectory, and complete the determination of the initial orbit.

Specifically, step S1 includes the following sub-steps:

S101. The observation data is divided into groups, and the vector data corresponding to every 3 time points is sorted into a group.

S102. For each group of vector data, the conventional Gauss method is adopted to find the target state vector at the corresponding time point to form a solution set of preliminary estimation.

Specifically, it is assumed that the observation time point is $[t_0, t_k]$, and $k+1 \geq 3$, and for input data $[t_0, t_k]$ of a total of $k+1$ time points, the interval parameter $Nrate = \lfloor rate*k \rfloor$ is taken, wherein $\lfloor \cdot \rfloor$ represents the rounding down, rate is the interval rate, and the grouped observation data is expressed as $\{\vec{L}_{t_{s1}}, \vec{L}_{t_{s2}}, \vec{L}_{t_{s3}}, \vec{R}_{t_{s1}}, \vec{R}_{t_{s2}}, \vec{R}_{t_{s3}}\}$, wherein $\vec{R}_{t_s}$ represents a satellite observation position vector, $\vec{L}_{t_s}$ represents an observation angle vector, $$\left\lfloor \frac{k - Nrate}{2} \right\rfloor \leq s2 \leq \left\lceil \frac{k - Nrate}{2} \right\rceil,$$

$$s1 = \left\lfloor \frac{2*s2 + Nrate - k + 1}{2} \right\rfloor,$$

$$s3 = \left\lceil \frac{2*s2 + Nrate - k + 1}{2} \right\rceil.$$

Specifically, step S2 includes the following sub-steps:

S201. The non-reasonable solutions in the solution set of preliminary estimation are eliminated.

S202. The remaining state vector solution set is divided into a position component vector solution set and a velocity component vector solution set, and clustering is performed respectively so that correct solutions are gathered in the same cluster as many as possible, thereby obtaining the position component vector solution cluster and the velocity component vector solution cluster.

S203. Noise reduction preprocessing is performed on the position component vector solution cluster and the velocity component vector solution cluster, respectively.

Specifically, position data and velocity data satisfying any one of conditions $|\vec{r}_{t_s}| < 6378.14$ km or $|\vec{r}_{t_s}| > 42378$ km or $|\vec{r}_{t_s}| > 11.2$ km/s are excluded, wherein $|\vec{r}_{t_s}|$ represents the target position vector at time point $t_s$, and $|\vec{v}_{t_s}|$ represents the target velocity vector at the time point $t_s$.

Specifically, in step S202, the k-means clustering method is used for clustering and the Chauvenet's—criterion discriminating method is adopted to eliminate abnormal data.

Specifically, step S3 includes the following sub-steps:

S301. The position component vector solution cluster and the velocity component vector solution cluster after the noise reduction are fitted to construct a state vector combination at various time points.

S302. A three-dimensional trajectory solution set of the target orbit is generated according to the state vector combination corresponding to various time points.

S303. The 3D trajectory solution set of the target orbit is projected to the instantaneous observation image plane according to the measurement status of the observation platform to obtain a 2D trajectory solution set.

Specifically, step S4 includes the following sub-steps:

S401. The derivative error and position error for each two-dimensional trajectory are calculated.

The formula for calculating the derivative error of the m-th two-dimensional trajectory is as follows:

$$\Delta uv'^m = \sum_{n=0}^{k} [|(2t_n \times \hat{U}'''^m + \hat{U}'^m) - (2t_n \times U''^* + U'^*)| +$$

$$|(2t_n \times \hat{V}'''^m + \hat{V}'^m) - (2t_n \times V''^* + V'^*)|]$$

$$\hat{U}_{t_n}^m = \hat{U}'''^m t_n^2 + \hat{U}'^m t_n + \hat{U}_0^m$$

$$\hat{V}_{t_n}^m = \hat{V}'''^m t_n^2 + \hat{V}'^m t_n + \hat{V}_0^m$$

$$U_{t_n}^* = U''^* t_n^2 + U'^* t_n + U_0^*$$

$$V_{t_n}^* = V''^* t_n^2 + V'^* t_n + V_0^*$$

wherein $U''^*$, $V''^*$, $U'^*$, $V'^*$ are the quadratic polynomial fitting parameters of the two-dimensional trajectory $\{l^* = (U_{t_n}, V_{t_n}^*, t_n, n=0, 1, 2, 3 \ldots k)\}$, $\hat{U}_{t_n}^m \hat{V}_{t_n}^m$ is the corresponding image plane coordinates of the estimated trajectory $l_m'$ at the time point $t_n$, m represents the m-th two-dimensional trajectory, and k is the total number of observation time points.

The formula for calculating the position error of the m-th two-dimensional trajectory is as follows:

$$Rt^m = \sum_{n=0}^{k} \frac{D_{t_n}^m}{Dc_{t_n}^m}$$

$$D_{t_n}^m = \sqrt{(\hat{U}_{t_n}^m - U_{t_n}^*)^2 + (\hat{V}_{t_n}^m - V_{t_n}^*)^2}$$

$$Dc_{t_n}^m = \sqrt{(U_c^m - U_{t_n}^*)^2 + (V_c^m - V_{t_n}^*)^2}$$

wherein, $D_{t_s}^m$ is the image plane distance between the predicted value and the observed value, $Dc_{t_s}^m$ is the image plane distance between the intersection point of the estimated trajectory and the observed trajectory and the observed point, to is the observation time, $\hat{U}_{t_n}^m \hat{V}_{t_n}^m$ is the corresponding image plane coordinate of the estimated trajectory $l_m'$ at the time point $t_n$, $U_{t_n}^* V_{t_n}^*$ is the corresponding image plane coordinate of the observed trajectory $l^*$ at the time point $t_n$, and $U_c^m V_c^m$ is the image plane coordinate of the intersection point of the estimated trajectory $l_m'$ and the observed trajectory.

S402. The derivative error and the position error are taken into comprehensive consideration to select the optimal two-dimensional trajectory, and the number of root of orbit corresponding thereto is used as the optimal estimated value.

S403. The number of root of orbit corresponding to the optimal two-dimensional trajectory is output, and the determination of the initial orbit is completed.

Specifically, step S402 is specifically as follows:

For the m-th orbit, the derivative error and position error are sorted from small to large, respectively, and the ranking sequence numbers $Rank_{vel,m}$ and $Rank_{dis,m}$ are obtained, the two sequence numbers are between $1 \sim N_{sv}$, and the sum of the two is calculated as the final error evaluation.

$$Rank_m = Rank_{vel,m} + Rank_{dis,m}$$

For the final error evaluation, the smallest one $m_{opt}$ is taken as the optimal predicted trajectory.

$$m_{opt} = \arg\min_m \{Rank_m; m = 1, 2, 3 \ldots N_{sv}\}$$

wherein, $N_{sv}$ is the number of orbit root obtained by the combination of the target position and the velocity data corresponding to various time points.

Second of all, an embodiment of the present disclosure provides a computer-readable storage medium, wherein the computer-readable storage medium stores a computer program, and when the computer program is executed by a processor, the short arc initial orbit determining method described in the first aspect is implemented.

In general, compared with the related art, the above technical solution provided by the present disclosure has the following advantageous effects:

1. The present disclosure divides the observation data into groups and performs the conventional Gauss method on each group of data to increase the degree of data utilization. The number of root of short arc target orbits finally determined based on combination of multiple sets of data will be closer to the true value.

2. The present disclosure addresses the multiple root problem by removing all non-reasonable data and performing noise smoothing on all roots, calculating their corresponding orbit root, and adopting the trajectory-first method to conduct evaluation, finally the orbit root having the highest evaluation index is selected as the estimated solution. The method of the disclosure can effectively solve the multiple root problem existing in conventional Gauss method.

DESCRIPTION OF THE EMBODIMENTS

In order to make the objectives, technical solutions, and advantages of the present disclosure clearer, the following further describes the present disclosure in detail with reference to the accompanying drawings and embodiments. It should be understood that the specific embodiments described herein are only used to explain the present disclosure and are not intended to limit the present disclosure.

First of all, some terms related to the present disclosure are explained as follows.

Solution Cluster: A Collection of Solutions

Figure 1:
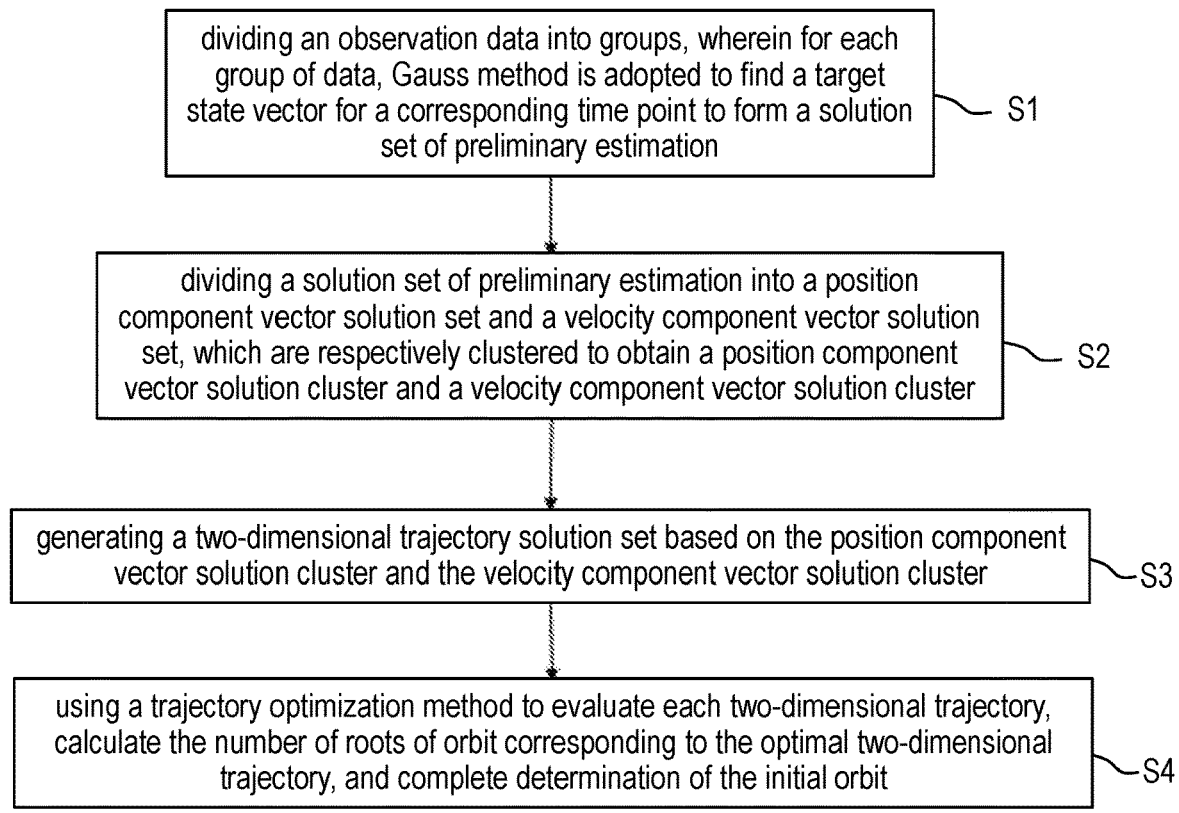
FIG. 1 is a flowchart of a short arc initial orbit determining method based on a Gauss solution cluster according to an embodiment of the present disclosure.

As shown in FIG. 1, the present disclosure provides a preferred short arc initial orbit determining method based on a Gauss solution cluster. The method includes the following steps:

S1. The observation data is divided into groups, and for each group of data, the Gauss method is adopted to find the target state vector for the corresponding time point to form a solution set of preliminary estimation.

S2. The solution set of preliminary estimation is divided into a position component vector solution set and a velocity component vector solution set, which are respectively clustered to obtain a position component vector solution cluster and a velocity component vector solution cluster.

S3. A two-dimensional trajectory solution set is generated based on the position component vector solution cluster and the velocity component vector solution cluster.

S4. The trajectory optimization method is adopted to evaluate each two-dimensional trajectory, calculate the number of root of orbit corresponding to the optimal two-dimensional trajectory, and complete the determination of the initial orbit.

Step S1. The observation data is divided into groups, and for each group of data, the Gauss method is adopted to find the target state vector for the corresponding time point to form a solution set of preliminary estimation.

S101. The observation data is divided into groups, and the vector data corresponding to every 3 time points is sorted into a group.

The observation data is observation data from space-based monocular imaging platform or Earth observation data. The observation data includes: the observation position (the position of the platform itself relative to the geocentric coordinate system) corresponding to each observation time point, the observation angle vector, satellite observation position vector represented by variant $\vec{R}_{t_s}$ at time point $t_s$, and observation angle vector represented by $\vec{T}_{t_s}$ at time point $t_s$. The position of the observation satellite, the angle of the observation camera, and the observation imaging data at the same time point constitute a pair of data, and multiple time point data constitute a group of data.

In order to construct a solution cluster subsequently, the present disclosure first needs to group the observation data, and the vector data corresponding to every 3 time points is sorted into a group. Assume that the observation time point is $[t_0, t_k]$, and $k+1 \geq 3$, and for input data $[t_0, t_k]$ of a total of $k+1$ time points, the interval parameter Nrate=$\lfloor$rate*k$\rfloor$ is taken, wherein $\lfloor \cdot \rfloor$ represents the rounding down, rate is the interval rate, normally the taken value is 0.2, and the grouped observation data is expressed as $\{\vec{L}_{t_{s1}}, \vec{L}_{t_{s2}}, \vec{L}_{t_{s3}}, \vec{R}_{t_{s1}}, \vec{R}_{t_{s2}}, \vec{R}_{t_{s3}}\}$, wherein $\vec{R}_{t_s}$ represents a satellite observation position vector, $\vec{L}_{t_s}$ represents an observation angle vector, $$\left\lfloor \frac{k - Nrate}{2} \right\rfloor \leq s2 \leq \left\lfloor \frac{k - Nrate}{2} \right\rfloor,$$

$$s1 = \left\lfloor \frac{2*s2 + Nrate - k + 1}{2} \right\rfloor,$$

$$s3 = \left\lfloor \frac{2*s2 + Nrate - k + 1}{2} \right\rfloor.$$

S102. For each group of vector data, the conventional Gauss method is adopted to find the target state vector at the corresponding time point to form a solution set of preliminary estimation.

Since the conventional Gauss method can only input three data and the input information is limited, the present disclosure pondered on using the Gauss method for multiple times to increase data utilization. The number of root of short arc target orbit finally determined based on a combination of multiple sets of data will be closer to the true value.

The Gauss method solves the target position vector and the target velocity vector at the intermediate time point s2 by inputting the observation position vector and the observation angle vector corresponding to three different time points. The target refers to an unpowered target, which can be a debris or a runaway satellite, etc. According to the method of the present disclosure, every three time points in a series of time points are sorted into a group, and each group of data is solved by the conventional Gauss method once to obtain the target position vector and velocity vector solution at the intermediate time point in the group of data. The number of solutions obtained from each group of vector data may be 1, 2, and 3. The Gauss method is adopted multiple times to find the target vector corresponding to different time points to form a collection of solutions of preliminary estimation.

Step S2. The solution set of preliminary estimation is divided into a position component vector solution set and a velocity component vector solution set, which are respectively clustered to obtain a position component vector solution cluster and a velocity component vector solution cluster.

S201. The non-reasonable solutions in the solution set of preliminary estimation are eliminated.

The position data and velocity data satisfying any one of conditions $|\vec{r}_{t_s}|<6378.14$ km (radius of Earth) or $|\vec{r}_{t_s}|>42378$ km (geostationary orbit radius) or $|\vec{v}_{t_s}|>11.2$ km/s (second cosmic velocity) are excluded, wherein $\vec{r}_{t_s}$ represents the target position vector at time point $t_s$, and $\vec{v}_{t_s}$ represents the target velocity vector at the time point $t_s$.

Obviously, a solution that satisfies any of the above three conditions is a non-reasonable solution. Therefore, the target position data in which the distance between the to-be-solved target position and center of Earth is smaller than the radius of the Earth or larger than the geostationary orbit radius and the target velocity data greater than the second cosmic velocity are excluded.

S202. The remaining state vector solution set is divided into a position component vector solution set and a velocity component vector solution set, and clustering is performed respectively so that correct solutions are gathered in the same cluster as many as possible, thereby obtaining the position component vector solution cluster and the velocity component vector solution cluster.

In order to separate the correct root from the wrong root so that the correct roots are gathered in the same cluster as many as possible, the position component vector solution set and the velocity component vector solution set are clustered respectively. The k-means clustering method is preferably adopted by the present disclosure for clustering (k is a value of 2 or 3), and Chauvenet's—criterion is adopted for discrimination to exclude abnormal data. The abnormal data refers to data that exhibits abnormality in the same group, such as outliers.

If the number of position solutions corresponding to various time points is less than or equal to 1, k-means clustering is not required; if the maximum number of position solutions corresponding to any time point is 2, then k-means clustering where k=2 is performed once; if the maximum number of position solutions corresponding to any time point is 3, a k-means clustering where k=3 is performed once. The velocity component vector solution set is clustered in the same way as described above.

S203. Noise reduction preprocessing is performed on the position component vector solution cluster and the velocity component vector solution cluster, respectively.

The present disclosure performs noise reduction preferably based on a Savitzky-Golay filtering method.

After all roots are processed by removing non-reasonable data and smoothing noise reduction, the accuracy of trajectory optimization can be improved.

Step S3. A two-dimensional trajectory solution set is generated based on the position component vector solution cluster and the velocity component vector solution cluster.

S301. The position component vector solution cluster and the velocity component vector solution cluster after the noise reduction are fitted to construct a state vector combination at various time points.

The data after noise deduction is utilized to perform fitting on the target position component vector and the target velocity component vector. The combination of velocity vector and position vector corresponding to the time point $t_s$ is ($\vec{r}_{t_s}'$, $\vec{v}_{t_s}'$, $t_s$).

S302. A three-dimensional trajectory solution set of the target orbit is generated according to the state vector combination corresponding to various time points.

With the combination ($\vec{r}_{t_s}'$, $\vec{v}_{t_s}'$, $t_s$) of the velocity vector and position vector corresponding to a certain time point $t_s$, the number of root $\{\hat{O}_m = (a_m, e_m, i_m, \Omega_m, \omega_m, M_m)\}$ of orbit corresponding to ($\vec{r}_{t_s}'$, $\vec{v}_{t_s}'$, $t_s$) is calculated. Based on the number of root of orbit, it can be determined that the three-dimensional trajectory solution set is $\{\hat{l}_m = (\hat{x}_{t_n}^m, \hat{y}_{t_n}^m, \hat{z}_{t_n}^m, t_n)\}$, wherein a is the semi-major axis, e is the first eccentricity, i is the inclination of the orbit, Q is the right ascension of the ascending intersection, ω is the perigee angle, and M is the mean anomaly, $(\hat{x}_{t_n}^m, \hat{x}_{t_n}^m, \hat{x}_{t_n}^m)$ is the corresponding three-dimensional coordinate of the observed trajectory $\hat{l}_m$ at the time point $t_n$, m=1, 2, . . . , $N_{sv}$, n=0, 1, . . . , k, $N_{sv}$ is the total number of root of orbit obtained based on the combination of the target positions and the velocity data corresponding to various time points.

S303. The 3D trajectory solution set of the target orbit is projected to the instantaneous observation image plane according to the measurement status of the observation platform to obtain a 2D trajectory solution set.

The 3D trajectory solution set $\{\hat{l}_m = (\hat{x}_{t_n}^m, \hat{y}_{t_n}^m, \hat{z}_{t_n}^m, t_n)\}$ of the target orbit is projected to the instantaneous observation image plane, thereby obtaining the 2D trajectory solution set $\{l_m' = \hat{U}_{t_n}^m, \hat{V}_{t_n}^m, t_n\}$, wherein $\hat{l}_m$ is m-th 3D observed trajectories, $(\hat{x}_{t_n}^m, \hat{x}_{t_n}^m, \hat{x}_{t_n}^m)$ is the corresponding 3D coordinate of the observed trajectory $\hat{l}_m$ at the time point $t_n$, $l_m'$ is the m-th estimated trajectory, $\hat{U}_{t_n}^m, \hat{V}_{t_n}^m$ is the corresponding image plane coordinate of the estimated trajectory $l_m'$ at the time point $t_n$, n=0, 1, . . . , k, m=1, 2, . . . , $N_{sv}$.

Step S4. The trajectory optimization method is adopted to evaluate each two-dimensional trajectory, calculate the number of roots of orbit corresponding to the optimal two-dimensional trajectory, and complete the determination of the initial orbit.

S401. The derivative error and position error for each two-dimensional trajectory are calculated.

The formula for calculating the derivative error of the m-th two-dimensional trajectory is as follows:

$$\Delta uv^m = \sum_{n=0}^{k} [|(2t_n \times \hat{U}''^m + \hat{U}'^m) - (2t_n \times U''^* + U'^*)| + $$

$$|(2t_n \times \hat{V}''^m + \hat{V}'^m) - (2t_n \times V''^* + V'^*)|]$$

$$\hat{U}_{t_n}^m = \hat{U}''^m t_n^2 + \hat{U}'^m t_n + \hat{U}_0^m$$

$$\hat{V}_{t_n}^m = \hat{V}''^m t_n^2 + \hat{V}'^m t_n + \hat{V}_0^m$$

$$U_{t_n}^* = U''^* t_n^2 + U'^* t_n + U_0^*$$

$$V_{t_n}^* = V''^* t_n^2 + V'^* t_n + V_0^*$$

wherein U"*, V"*, U'*, V'* are the quadratic polynomial fitting parameters of the two-dimensional trajectory $\{l^* = (U_{t_n}, V_{t_n}^*, t_n, n=0, 1, 2, 3 . . . k)\}$, $\hat{U}_{t_n}^m, \hat{V}_{t_n}^m$ is the corresponding image plane coordinates of the estimated trajectory $l_m'$ at the time point $t_n$, m represents the m-th two-dimensional trajectory, and k is the total number of observation time points.

The camera parameters (orientation) remain the same, and the phase plane coordinates ($U_{t_n}^*$, $V_{t_n}^*$) of various time points with respect to the observation of target can be obtained. Quadratic polynomial fitting is performed on the observation data for two times in U and V directions respectively, thereby obtaining the second term and the fourth term.

The formula for calculating the position error of the m-th two-dimensional trajectory is as follows:

$$Rt^m = \sum_{n=0}^{k} \frac{D_{t_n}^m}{Dc_{t_n}^m}$$

-continued $$D_{t_n}^m = \sqrt{(\hat{U}_{t_n}^m - U_{t_n}^*)^2 + (\hat{V}_{t_n}^m - V_{t_n}^*)^2}$$

$$Dc_{t_n}^m = \sqrt{(U_c^m - U_{t_n}^*)^2 + (V_c^m - V_{t_n}^*)^2}$$

wherein, $D_{t_n}^m$ is the image plane distance between the predicted value and the observed value, $Dc_{t_n}^m$ is the image plane distance between the intersection point of the estimated trajectory and the observed trajectory and the observed point, $t_n$ is the observation time, $\hat{U}_{t_n}^m, \hat{V}_{t_n}^m$ is the corresponding image plane coordinate of the estimated trajectory $l_m'$ at the time point $t_n$, $U_{t_n}^* * V_{t_n}^*$ is the corresponding image plane coordinate of the observed trajectory l* at the time point $t_n$, and $U_c^m V_c^m$ is the image plane coordinate of the intersection point of the estimated trajectory $l_m'$ and the observed trajectory.

S402. The derivative error and the position error are taken into comprehensive consideration to select the optimal two-dimensional trajectory, and the number of root of orbit corresponding thereto is used as the optimal estimated value.

For the m-th orbit, the derivative error and position error are sorted from small to large, respectively, and the ranking sequence numbers $Rank_{vel,m}$ and $Rank_{dis,m}$ are obtained, the two sequence numbers are between $1{\sim}N_{sv}$, and the sum of the two is calculated as the final error evaluation.

$$Rank_m = Rank_{vel,m} + Rank_{dis,m}$$

For the final error evaluation, take the smallest value $m_{opt}$ as the optimal two-dimensional trajectory:

$$m_{opt} = \arg\min_m \{Rank_m; m = 1, 2, 3 \ldots N_{sv}\}$$

wherein, $N_{sv}$ is the number of root of orbits obtained based on the combination of the target position and the velocity data corresponding to various time points.

S403. The number of root of orbit corresponding to the optimal two-dimensional trajectory is output, and the determination of the initial orbit is completed.

The present disclosure is suitable for single space-based imaging observation platform, long-range unpowered targets under short-term observation conditions (greater than 5 s), such as debris, out-of-control satellites, etc. The disclosure can effectively solve the problem of multiple roots that cannot be solved by the conventional Gauss method, and has higher utilization of original observation data. Moreover, the present disclosure adopts the concept of solution cluster and optimal method to improve the accuracy of the initial orbit determination. Under the same input error conditions, the technical solution of the present disclosure has better performance than other schemes in terms of the short-term observation data, that is, the present disclosure is more suitable for short-arc observation than other disclosures.

Example 1

As shown in Table 1, Table 1 shows data of observation satellites and number of root of target orbits in Example 1.

TABLE 1

|  | a (km) | e | i (°) | u (°) | Ω (°) |
|---|---|---|---|---|---|
| Observing space-based data | 6978.1 | 0 | 97.6893 | 0.1719 | 275.5927 |
| Target data | 6987.0 | 7.8e−09 | 79.1255 | 4.7555 | 272.7279 |

S101. The observation data is divided into groups, and the vector data corresponding to every 3 time points is sorted into a group.

With respect to the input data $[t_0, t_{170}]$ of a total of 171 time points, the interval parameter $Nrate=\lfloor rate*k \rfloor$ is taken, the observation data $\{\vec{L}_{t_{s1}}, \vec{L}_{t_{s2}}, \vec{L}_{t_{s3}}, \vec{R}_{t_{s1}}, \vec{R}_{t_{s2}}, \vec{R}_{t_{s3}}\}$ is sorted into a group, wherein $\lfloor \cdot \rfloor$ represents the rounding down, rate is the interval rate, and $$rate = 0.2, s1 = \left\lfloor \frac{2*s2 + 34 - 170 + 1}{2} \right\rfloor,$$

$$\left\lfloor \frac{170 - 34}{2} \right\rfloor \leq s2 \leq \left\lfloor \frac{170 + 34}{2} \right\rfloor,$$

$$s3 = \left\lfloor \frac{2*s2 - 34 + 170 - 1}{2} \right\rfloor,$$

$\vec{R}_{t_s}$ represents a satellite observation position vector, $\vec{L}_{t_s}$ represents an observation angle vector.

With respect to the observation satellites and the number of root of target orbits in the data in Table 1, simulation is conducted to obtain the data regarding observation satellites and partial position of the target as shown in Table 2.

TABLE 2

| Point number | t (s) | $\vec{r}_t$ (km) | | | $\hat{L}_t$ (incl. error/km) | | | $\vec{R}_t$ (km) | | |
|---|---|---|---|---|---|---|---|---|---|---|
| | | $x_{t_s}$ | $y_{t_s}$ | $z_{t_s}$ | $x_{t_s}$ | $y_{t_s}$ | $z_{t_s}$ | $x_{t_s}$ | $y_{t_s}$ | $z_{t_s}$ |
| 0 | 0.0 | 306.30 | −6980.14 | −52.03 | −0.9877 | −0.0934 | −0.1254 | 705.00 | −6942.43 | −1.41 |
| 34 | 3.4 | 311.15 | −6980.06 | −26.81 | −0.9872 | −0.09439 | −0.1285 | 701.58 | −6942.73 | 24.01 |
| 68 | 6.8 | 315.99 | −6979.90 | −1.59 | −0.9867 | −0.0954 | −0.1318 | 698.15 | −6942.94 | 49.44 |
| 102 | 10.2 | 320.84 | −6979.64 | 23.62 | −0.9861 | −0.0964 | −0.1351 | 694.71 | −6943.06 | 74.87 |
| 136 | 13.6 | 325.67 | −6979.28 | 48.84 | −0.9855 | −0.0976 | −0.1387 | 691.26 | −6943.09 | 100.30 |
| 170 | 17.0 | 330.37 | −6978.85 | 73.31 | −0.9848 | −0.0987 | −0.1424 | 687.80 | −6943.01 | 125.73 |

S102. For each group of vector data, the conventional Gauss method is adopted to find the target state vector at the corresponding time point to form a solution set of preliminary estimation.

Figure 2:
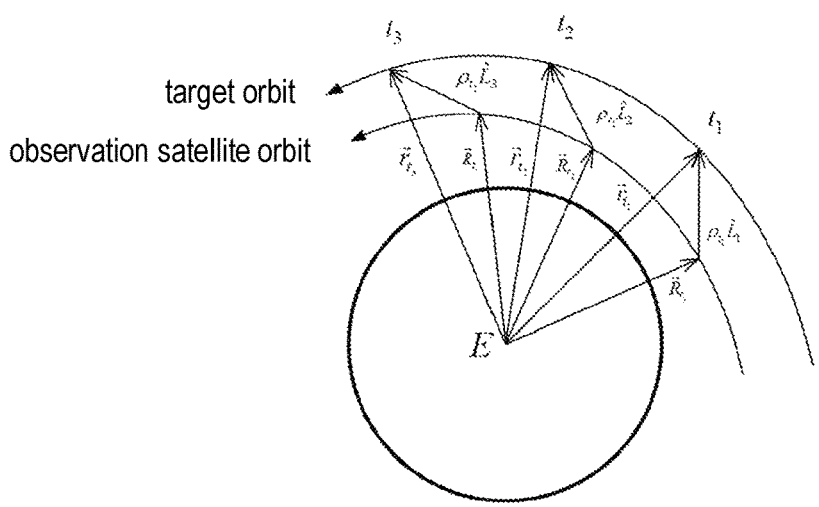
FIG. 2 is a schematic diagram showing space-based observation according to an embodiment of the present disclosure.
Figure 3:
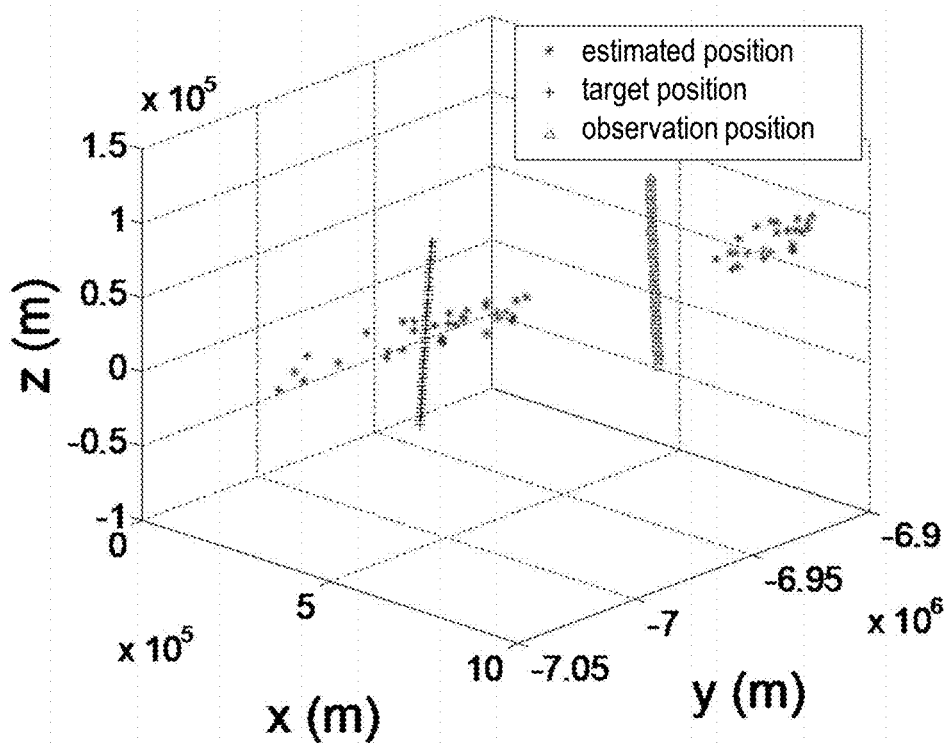
FIG. 3 is a solution cluster diagram of a target position obtained by the Gauss method according to an embodiment of the present disclosure.
Figure 4:
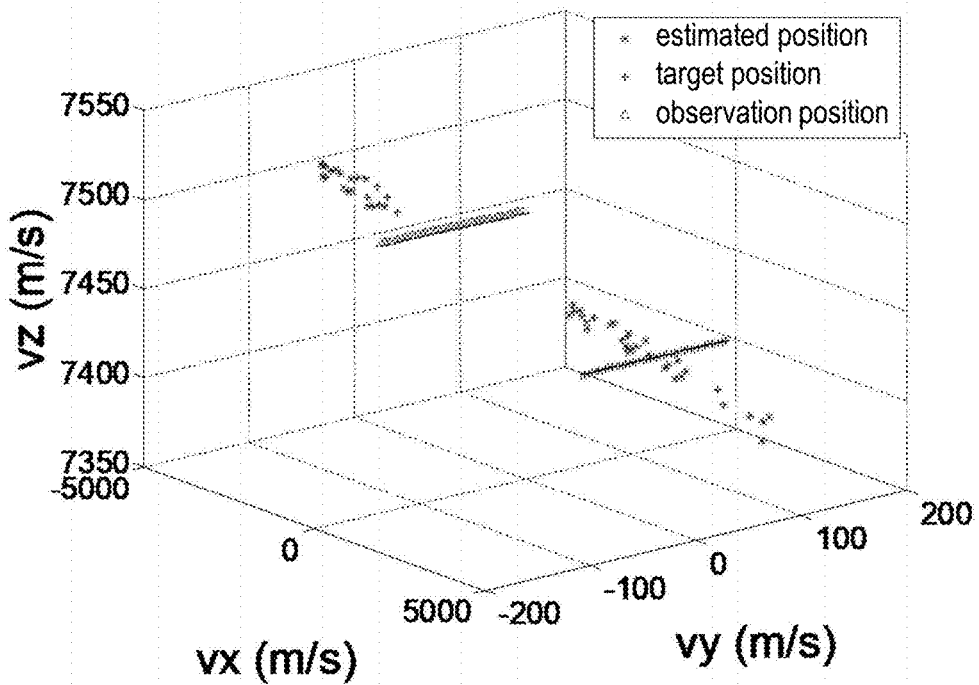
FIG. 4 is a clustering diagram of k-means clustering performed on position solution cluster according to an embodiment of the present disclosure.

A single group of data after grouping is as shown in FIG. 2, point E represents the center of the coordinate system. The distance between the observation point and the target is defined as $\rho_i$, then:

$$\begin{cases} \vec{r_1} = \vec{R_1} + \rho_1 \vec{L_1} \\ \vec{r_2} = \vec{R_2} + \rho_2 \vec{L_2} \\ \vec{r_3} = \vec{R_3} + \rho_3 \vec{L_3} \end{cases}$$

wherein, the satellite observation position vector at the time point $t_i$ and the corresponding position vector of the target are $\vec{R}_i$ and $\vec{r}_i$ respectively, and the unit sight vector corresponding to the observation time points $t_1$, $t_2$ and $t_3$ are $\vec{L}_1$, $\vec{L}_2$ and $\vec{L}_3$ respectively. There are six unknown vectors in the above formula, namely, $\vec{r}_1$, $\vec{r}_2$ and $\vec{r}_3$ as well as $\rho_1$, $\rho_2$ and $\rho_3$; $r_2$ is the magnitude of $\vec{r}_2$, and the obtained target position is as shown in FIG. 3, the target velocity is as shown in FIG. 4, wherein the mark * indicates the calculated position solution, the mark + indicates the actual position solution of target, and the mark ▲ indicates the observation satellite position. According to the Gauss method, the initial value of $\vec{r}_2$ and $\vec{v}_2$ can be solved, and the data obtained from this example is shown in Table 3. Table 3 shows data concerning target position and velocity solution cluster based on Gauss method in Example 1.

TABLE 3

| Combination of sequence | Point$_{t_{s1}}$ Point$_{t_{s2}}$ Point$_{t_{s3}}$ | position vector solution set based on Gauss method (km, km, km) | velocity vector solution set based on Gauss method (m/s, m/s, m/s) | Position vector data after removal of non-reasonable data (km, km, km) |
|---|---|---|---|---|
| 1 | Point 0, Point 68, Point 136 | (−162380.97, −22712.67, −21732.39); (256.55, −6985.65, −9.53); (880.40, −6925.32, 73.78) | (1037557.63, 47310.82, −19460.97); (1801.66, 79.89, 7407.1059); (−2171.29, −101.28, 7510.17) | (256.55, −6985.65, −9.53); (880.40, −6925.32, 73.78) |
| ... | ... | ... | ... | ... |
| 34 | Point 34, Point 102, Point 170 | (−145427.83, −21233.37, −19943.24); (247.73, −6986.78, 12.88); (874.68, −6925.47, 98.77) | (948881.44, 43250.12, −17276.82); (1892.90, 110.84, 7404.08); (−2182.56, −74.81, 7510.29) | (247.73, −6986.78, 12.88); (874.68, −6925.47, 98.77) |

S201. The non-reasonable solutions in the solution set of preliminary estimation are eliminated.

The principle for elimination is that positions and velocity data that satisfy $|\vec{r}_{t_s}|<6378.14$ km, $|\vec{r}_{t_s}|>42378$ km and $|\vec{v}_{t_s}|>11.2$ km/s are excluded. The obtained positions and velocity in the example are as shown in Table 4, which shows the target position error data before smoothing in Example 1.

TABLE 4

| Set | Point$_{t_{s1}}$ Point$_{t_{s2}}$ Point$_{t_{s3}}$ | Optimized position vector (km, km, km) | Simulated position vector (km, km, km) | Position vector error (km, km, km) |
|---|---|---|---|---|
| 1 | Point 0, Point 68, Point 136 | (256.55, −6985.65, −9.53); (880.40, −6925.32, 73.78) | (315.99, −6979.90, −1.59) | (59.44, 5.74, 7.94) (−564.40, −54.57, −75.38) |
| ... | ... | ... | ... | ... |
| 34 | Point 34, Point 102, Point 170 | (247.73, −6986.78, 12.88) (874.68, −6925.47, 98.77) | (320.84, −6979.64, 23.62) | (73.10, 7.14, 10.73) (−553.84, −54.16, −75.14) |

It can be expressed as follows.

$$\left\{ (\vec{r}_{t_s}^m, t_s); m = 1, 2, 3 \ldots N; \left( \left\lceil \frac{170-34}{2} \right\rceil \leq s \leq \left\lfloor \frac{170+34}{2} \right\rfloor \right) \right\}$$

$$\left\{ (\vec{v}_{t_s}^m, t_s); m = 1, 2, 3 \ldots N; \left( \left\lceil \frac{170-34}{2} \right\rceil \leq s \leq \left\lfloor \frac{170+34}{2} \right\rfloor \right) \right\}$$

wherein, N is the number of remaining positions or velocity solutions after removing non-reasonable data.

S202. The remaining state vector solution set is divided into a position component vector solution set and a velocity component vector solution set, and clustering is performed respectively so that correct solutions are gathered in the same cluster as many as possible, thereby obtaining the position component vector solution cluster and the velocity component vector solution cluster.

Perform k-means clustering on the obtained $$\left\{ (\vec{r}_{t_s}^m, t_s), (\vec{v}_{t_s}^m, t_s); m = 1, 2, 3 \ldots N; \left( \left\lceil \frac{170-34}{2} \right\rceil \leq s \leq \left\lfloor \frac{170+34}{2} \right\rfloor \right) \right\}$$

respectively. Preferably, if the number of position solutions corresponding to all the time points is 1, k-means clustering is not required; if the maximum number of position solutions corresponding to any time point is 2, then k-means clustering where k=2 is performed once; if the maximum number of position solutions corresponding to any time point is 3, a k-means clustering where k=3 is performed once. The velocity component vector solution set is clustered in the same way as described above.

Figure 5:
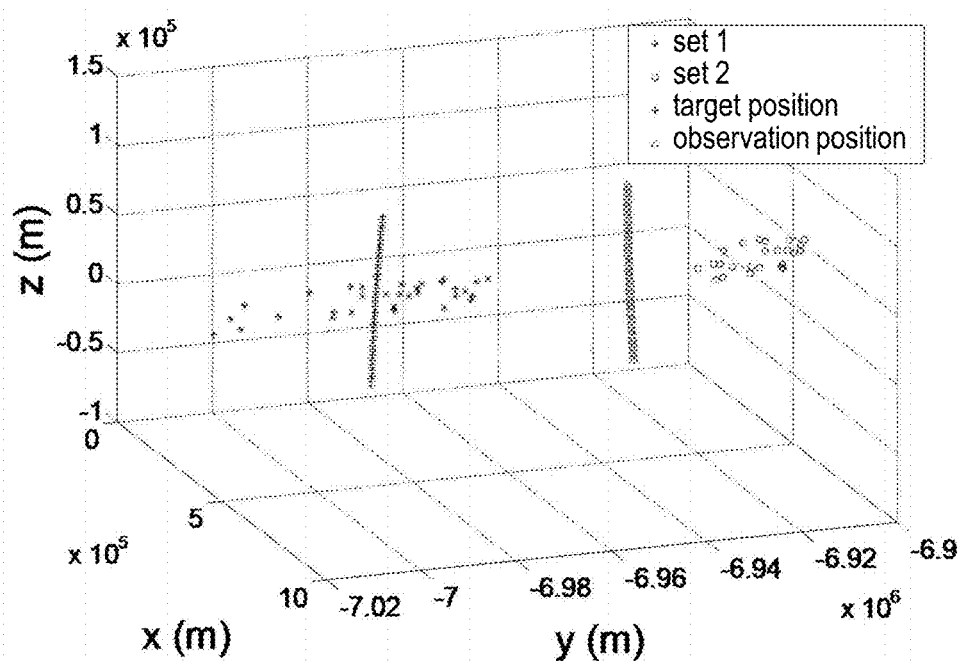
FIG. 5 is a position solution clustering diagram after the adopted Savitzky-Golay is smoothed according to an embodiment of the present disclosure.

Taking the location solution as an example, the clustering result is shown in FIG. 5, wherein the mark * indicates cluster 1, the mark o indicates cluster 2, the mark + is the target actual positions, and the mark ▲ indicates the observation satellite position. The data in this example is as shown in Table 5, which shows the target position error data in Example 1 after smoothing.

TABLE 5

|  | $a$ (km) | $e$ | incl (°) | $\omega$ (°) | $\Omega$ (°) | M (°) | $u$ (°) |
|---|---|---|---|---|---|---|---|
| Target data | 6987.0 | 7.8e−09 | 79.1255 | / | 272.7279 | / | 4.7555 |
| Data of present method | 6928.366 | 0.008 | 80.6249 | 185.7025 | 272.7467 | 173.7632 | −0.5343 |
| Original solution data 1 based on Gauss method | −0.236 | 143393.4 | 84.1812 | 88.1617 | 2.7930 | 0 | 88.1617 |
| Original solution data 2 based on Gauss method | 8447.614 | 0.1748 | 112.7304 | 11.4240 | 278.8715 | 352.7453 | 4.1693 |
| Original solution data 3 based on Gauss method | 6805.225 | 0.0262 | 86.0354 | 189.0760 | 273.7521 | 170.6514 | −0.2726 |

Example 1 adopts Chauvenet's —criterion for discrimination to eliminate abnormal data.

When the confidence probability is taken as $$1 - \frac{1}{2n},$$

the confidence probability formula of Chauvenet's—criterion can be expressed as: $w_n = 1 + 0.4\ln(n)$.

With respect to the value $x_i$ to be tested, the absolute value of the difference between the value $x_i$ and the sample mean is calculated. If the following formula is satisfied, the current value to be tested is excluded: $|x_i - \bar{x}| > w_n S_x$, wherein $x_i$ is the value to be tested. Here, the components in the three directions (x, y, z) of the position and velocity vectors are selected for three detections respectively. If any one of the detections satisfies the above formula, then it is excluded. $\bar{x}$ is the average value of such sample, $w_n$ is the confidence probability of the Chauvenet's criterion, $S_x$ is the standard deviation of such sample.

S203. Noise reduction preprocessing is performed on the position component vector solution cluster and the velocity component vector solution cluster, respectively.

The present disclosure performs noise reduction preferably based on a Savitzky-Golay filtering method, and the processing is as follows:

$$\begin{pmatrix} \bar{x}_{t_{s-2}} & \bar{x}_{t_{s-1}} & \bar{x}_{t_s} & \bar{x}_{t_{s+1}} & \bar{x}_{t_{s+1}} \\ \bar{y}_{t_{s-1}} & \bar{y}_{t_{s-1}} & \bar{y}_{t_s} & \bar{y}_{t_{s+1}} & \bar{y}_{t_{s+1}} \\ \bar{z}_{t_{s-1}} & \bar{z}_{t_{s-1}} & \bar{z}_{t_s} & \bar{z}_{t_{s+1}} & \bar{z}_{t_{s+1}} \end{pmatrix}^T =$$

-continued $$\frac{1}{70}\begin{pmatrix} 69 & 4 & -6 & 4 & -1 \\ 4 & 54 & 24 & -16 & 4 \\ -6 & 24 & 34 & 24 & -6 \\ 4 & -16 & 24 & 54 & 4 \\ -1 & 4 & -6 & 4 & 69 \end{pmatrix} \begin{pmatrix} x_{t_{s-2}} & x_{t_{s-1}} & x_{t_s} & x_{t_{s+1}} & x_{t_{s+2}} \\ y_{t_{s-2}} & y_{t_{s-1}} & y_{t_s} & y_{t_{s+1}} & y_{t_{s+2}} \\ z_{t_{s-2}} & z_{t_{s-1}} & z_{t_s} & z_{t_{s+1}} & z_{t_{s+2}} \end{pmatrix}^T$$

Figure 6:
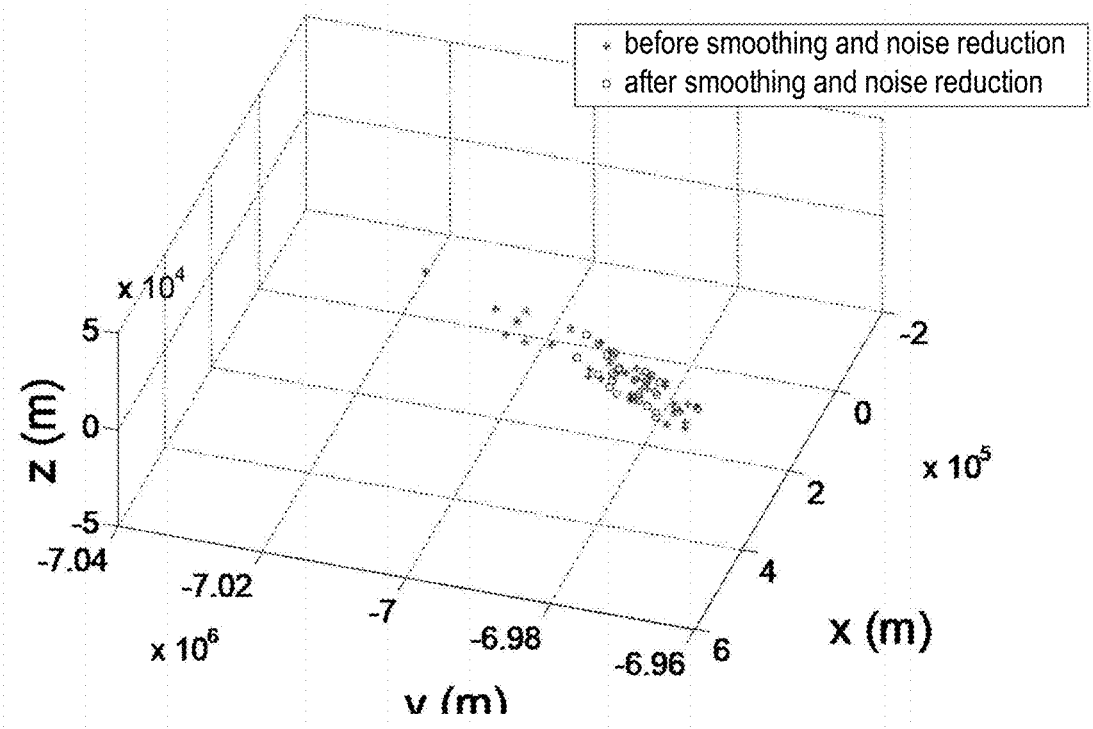
FIG. 6 is a three-dimensional diagram corresponding to various position solutions obtained by calculating orbit roots according to an embodiment of the present disclosure.

After using the above-mentioned five-point and three-order template for smoothing, the noise can be effectively reduced in three directions (x, y, z). The position data after smoothing will be more concentrated in the solution space. Take the position solution cluster as an example, the results before and after smoothing are shown in FIG. 6, wherein the mark * indicates the target position before smoothing, the mark o indicates the target position after smoothing.

S301. The position component vector solution cluster and the velocity component vector solution cluster after the noise reduction are fitted to construct a state vector combination at various time points.

For the data after smoothing and noise-reduction, a quadratic polynomial fitting is performed in three directions of x, y, and z. After calculating the estimated values of the target positions corresponding to each intermediate time point $$\left\{ t'_s; \left\lfloor \frac{170-34}{2} \right\rfloor \le s \le \left\lfloor \frac{170+34}{2} \right\rfloor \right\}$$

on the x, y, and z components, they can be combined to obtain the corresponding position correction estimated value $$\left\{\vec{r}_{t_s}'; \left\lfloor\frac{170-34}{2}\right\rfloor \leq s \leq \left\lfloor\frac{170+34}{2}\right\rfloor\right\}$$

and velocity correction estimated value $$\left\{\vec{r}_{t_s}'; \left\lfloor\frac{170-34}{2}\right\rfloor \leq s \leq \left\lfloor\frac{170+34}{2}\right\rfloor\right\}.$$

S302. A three-dimensional trajectory solution set of the target orbit is generated according to the state vector combination corresponding to various time points.

S303. The 3D trajectory solution set of the target orbit is projected to the instantaneous observation image plane according to the measurement status of the observation platform to obtain a 2D trajectory solution set.

Figure 7:
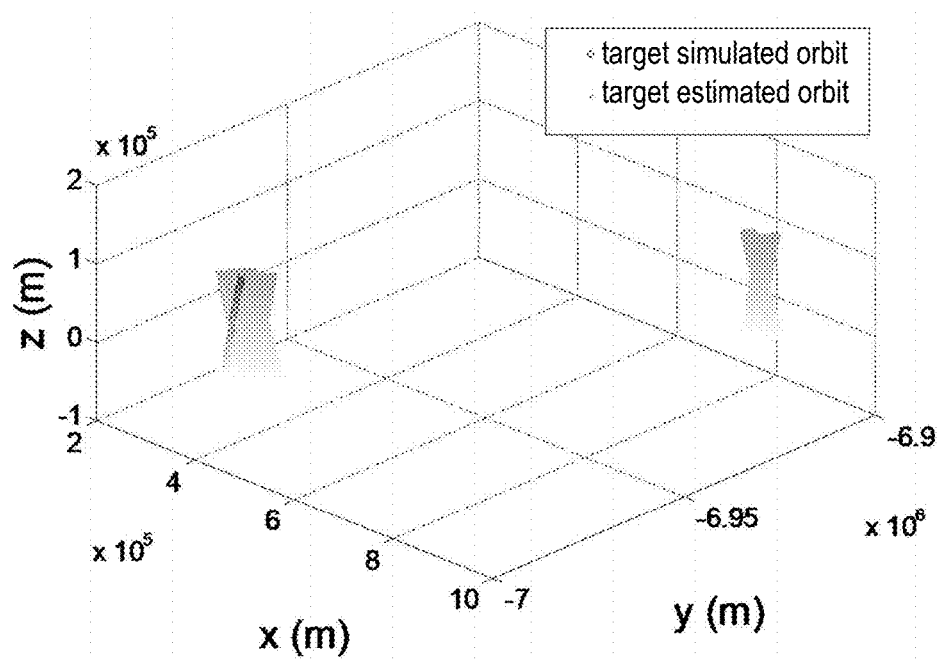
FIG. 7 is a two-dimensional diagram showing projection of the three-dimensional orbit corresponding to various position solutions projected on the image plane according to an embodiment of the present disclosure.

Find the corresponding target fitting positions at the same time points and combine them to obtain 2×2×34 pairs of positions and velocity and time combination ($\vec{r}_{t_s}'$, $\vec{v}_{t_s}'$, $t_s$). Calculate the corresponding number of root of orbits $\{\hat{O}_m = (a_m, e_m, \text{incl}_m, \Omega_m, \omega_m, M_m, \Omega_m); m=1, 2, 3, \ldots, N_{sv}\}$, the corresponding target orbits $\{\hat{1}_m = (\hat{x}_{t_n}^m, \hat{y}_{t_n}^m, \hat{z}_{t_n}^m, t_n, n=0, 1, 2, 3 \ldots k); m=1, 2, 3, \ldots, N_{sv}\}$, and the trajectory of the target orbit projected onto the image plane: $\{1^* = (U_{t_n}, V_{t_n}^*, t_n, n=0, 1, 2, 3 \ldots k); m=1, 2, 3, \ldots, N_{sv}\}$. The obtained target predicted orbit is as shown in FIG. 7, wherein the mark indicates an estimated orbit, and mark o indicates a target simulated orbit.

S401. The derivative error and position error for each two-dimensional trajectory are calculated.

The formula for calculating the derivative error of the m-th two-dimensional trajectory is as follows:

$$\Delta uv'^m = \sum_{n=0}^{k}[|(2t_n \times \hat{U}''^m + \hat{U}'^m) - (2t_n \times U''^* + U'^*)| +$$

$$|(2t_n \times \hat{V}''^m + \hat{V}'^m) - (2t_n \times V''^* + V'^*)|]$$

$$\hat{U}_{t_n}^m = \hat{U}''^m t_n^2 + \hat{U}'^m t_n + \hat{U}_0^m$$

$$\hat{V}_{t_n}^m = \hat{V}''^m t_n^2 + \hat{V}'^m t_n + \hat{V}_0^m$$

$$U_{t_n}^* = U''^* t_n^2 + U'^* t_n + U_0^*$$

$$V_{t_n}^* = V''^* t_n^2 + V'^* t_n + V_0^*$$

wherein U"*, V"*, U'*, V'* are the quadratic polynomial fitting parameters of the two-dimensional trajectory $\{1^* = (U_{t_n}, V_{t_n}^*, t_n, n=0, 1, 2, 3 \ldots k)\}$, $\hat{U}_{t_n}^m, \hat{V}_{t_n}^m$ is the corresponding image plane coordinates of the estimated trajectory $1_m'$ at the time point $t_n$, m represents the m-th two-dimensional trajectory, and k is the total number of observation time points.

The camera parameters (orientation) remain the same, and the phase plane coordinates ($U_{t_n}^*$, $V_{t_n}^*$) of various time points with respect to the observation of target can be obtained. Quadratic polynomial fitting is performed on the observation data for two times in U and V directions respectively, thereby obtaining the second term and the fourth term.

The formula for calculating the position error of the m-th two-dimensional trajectory is as follows:

$$Rt^m = \sum_{n=0}^{k} \frac{D_{t_n}^m}{Dc_{t_n}^m}$$

$$D_{t_n}^m = \sqrt{(\hat{U}_{t_n}^m - U_{t_n}^*)^2 + (\hat{V}_{t_n}^m - V_{t_n}^*)^2}$$

$$Dc_{t_n}^m = \sqrt{(U_c^m - U_{t_n}^*)^2 + (V_c^m - V_{t_n}^*)^2}$$

wherein, $D_{t_n}^m$ is the image plane distance between the predicted value and the observed value, $Dc_{t_n}^m$ is the image plane distance between the intersection point of the estimated trajectory and the observed trajectory and the observed point, $t_n$ is the observation time, $\hat{U}_{t_n}^m, \hat{V}_{t_n}^m$ is the corresponding image plane coordinate of the estimated trajectory $1_m'$ at the time point $t_n$, $U_{t_n}^* V_{t_n}^*$ is the corresponding image plane coordinate of the observed trajectory $1^*$ at the time point $t_n$, and $U_c^m V_c^m$ is the image plane coordinate of the intersection point of the estimated trajectory $1_m'$ and the observed trajectory.

S402. The derivative error and the position error are taken into comprehensive consideration to select the optimal two-dimensional trajectory, and the number of root of orbit corresponding thereto is used as the optimal estimated value.

For the m-th orbit, the derivative error and position error are sorted from small to large, respectively, and the ranking sequence numbers $\text{Rank}_{vel,m}$ and $\text{Rank}_{dis,m}$ are obtained, the two sequence numbers are between $1 \sim N_{sv}$, and the sum of the two is calculated as the final error evaluation.

$$\text{Rank}_m = \text{Rank}_{vel,m} + \text{Rank}_{dis,m}$$

For the final error evaluation, take the smallest value $m_{opt}$ as the optimal two-dimensional trajectory:

$$m_{opt} = \arg\min_m \{Rank_m; m = 1, 2, 3 \ldots N_{sv}\}$$

wherein, $N_{sv}$ is the number of root of orbits obtained based on the combination of the target position and the velocity data corresponding to various time points.

S403. The number of root of orbit corresponding to the optimal two-dimensional trajectory is output, and the determination of the initial orbit is completed.

Figure 8:
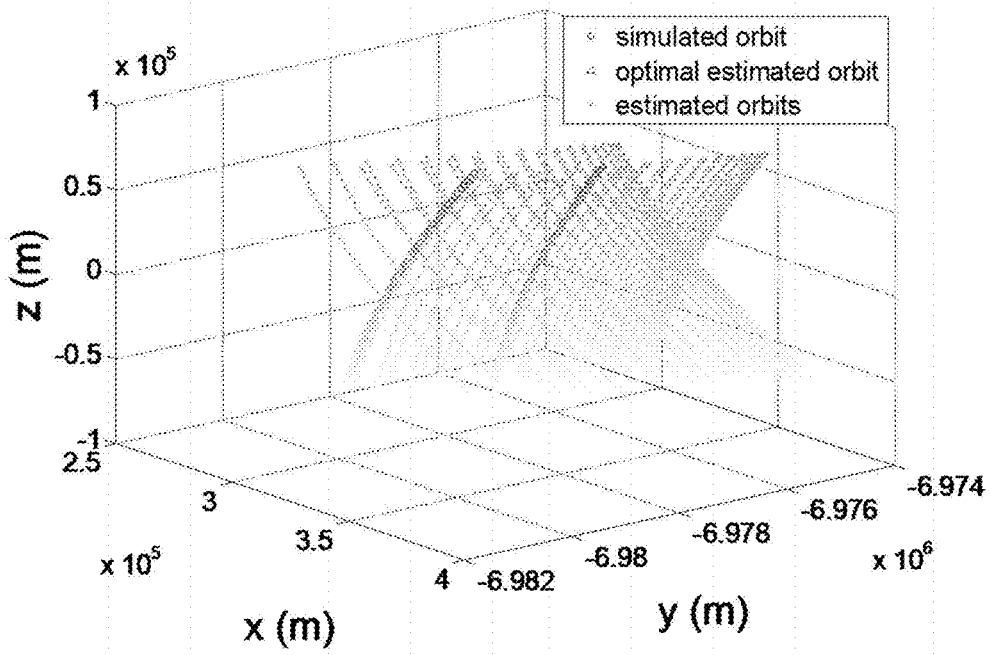
FIG. 8 is a three-dimensional diagram of an optimal orbit and an actual observation orbit according to an embodiment of the present disclosure.
Figure 9:
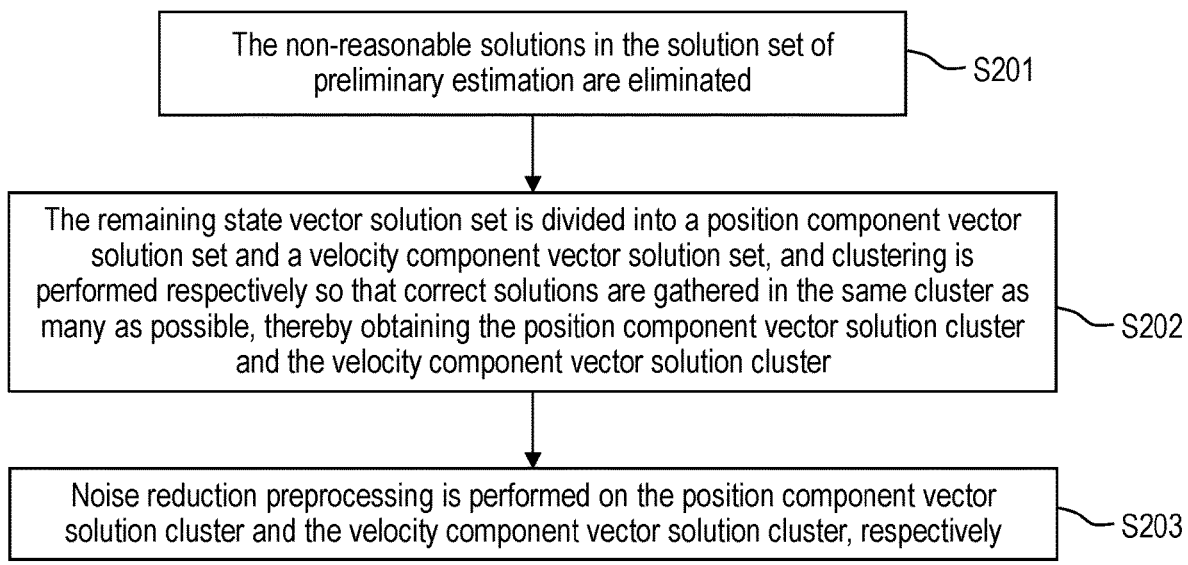
FIG. 9 is a flowchart of sub-steps of step S2 based on a Gauss solution cluster according to an embodiment of the present disclosure.
Figure 10:
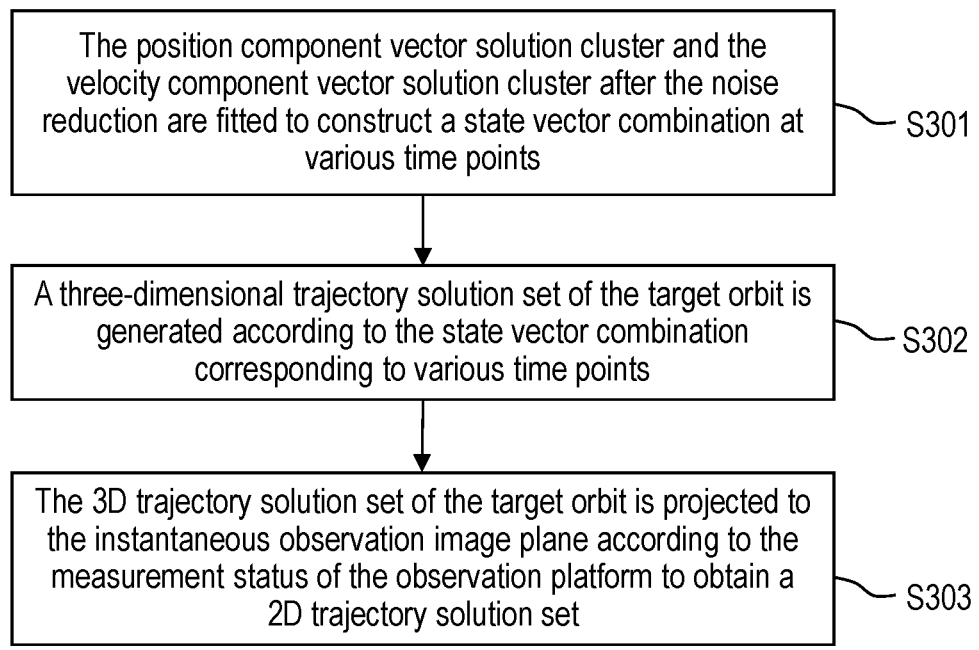
FIG. 10 is a flowchart of sub-steps of step S3 based on a Gauss solution cluster according to an embodiment of the present disclosure.
Figure 11:
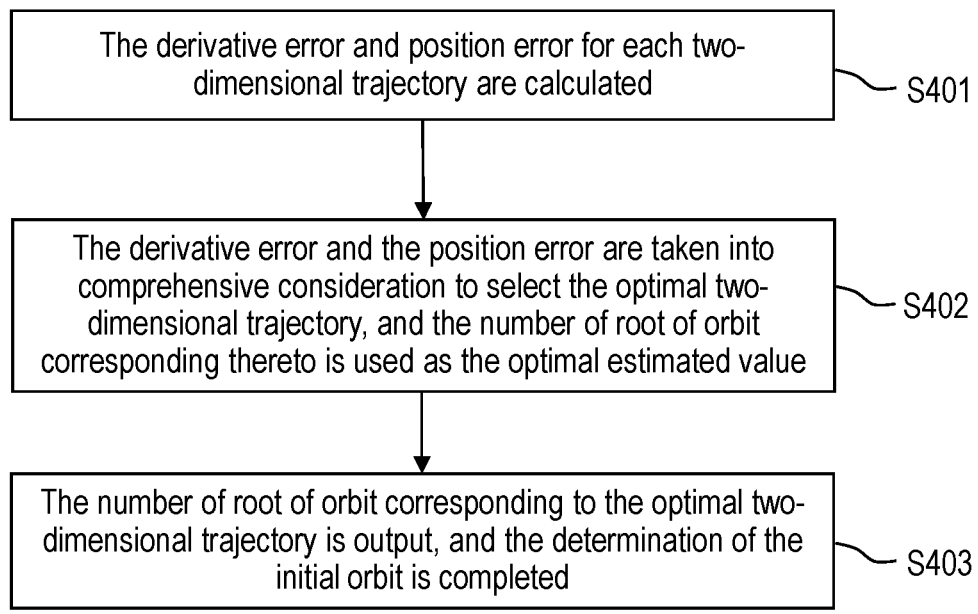
FIG. 11 is a flowchart of sub-steps of step S4 based on a Gauss solution cluster according to an embodiment of the present disclosure.

As shown in FIG. 8, the mark represents all estimated orbits, ▲ represents a preferred estimated orbit, and mark o is a target simulated orbit.

The above are only the preferred embodiments of this application, but the scope of this application is not limited thereto. Any changes or replacements that can be easily derived by person skilled in the art based on the technical scope disclosed in the present disclosure should fall within the technical scope disclosed in this application. Therefore, the scope sought to be protected by this application shall be subject to the scope of the claims.

What is claimed is:

1. A short arc initial orbit determining method for single space-based imaging observation platform based on Gauss solution cluster, wherein the method comprises the following steps:
    S1. dividing an observation data, which are captured by an observation camera, into groups, wherein for each group of data, Gauss method is adopted to find a target state vector for a corresponding time point to form a solution set of preliminary estimation;
    S2. dividing a solution set of preliminary estimation into a position component vector solution set and a velocity component vector solution set, which are respectively clustered to obtain a position component vector solution cluster and a velocity component vector solution cluster;

S3. generating a two-dimensional trajectory solution set based on the position component vector solution cluster and the velocity component vector solution cluster;

S4. using a trajectory optimization method to evaluate each two-dimensional trajectory, calculate the number of roots of orbit corresponding to the optimal two-dimensional trajectory, and complete determination of the short arc initial orbit;

wherein step S2 comprises the following sub-steps:

S201. eliminating non-reasonable solutions from the solution set of preliminary estimation;

S202. dividing the remaining state vector solution set into a position component vector solution set and a velocity component vector solution set, and clustering being performed respectively so correct solutions are gathered in the same cluster as many as possible, thereby obtaining a position component vector solution cluster and a velocity component vector solution cluster;

S203. performing noise reduction preprocessing on the position component vector solution cluster and the velocity component vector solution cluster, respectively.

2. The short arc initial orbit determining method according to claim 1, wherein step S1 comprises the following sub-steps:

S101. dividing the observation data into groups, and vector data corresponding to every 3 time points being sorted into a group;

S102. for each group of vector data, using the conventional Gauss method to find a target state vector at the corresponding time point to form a solution set of preliminary estimation.

3. The short arc initial orbit determining method according to claim 2, wherein it is assumed that an observation time point is $[t_0, t_k]$, and $k+1 \geq 3$, and for input data $[t_0, t_k]$ of a total of $k+1$ time points, the interval parameter $\text{Nrate} = \lfloor \text{rate} * k \rfloor$ is taken, wherein $\lfloor \cdot \rfloor$ represents the rounding down, rate is the interval rate, and the grouped observation data is expressed as $\{\vec{L}_{t_{s1}}, \vec{L}_{t_{s2}}, \vec{L}_{t_{s3}}, \vec{R}_{t_{s1}}, \vec{R}_{t_{s2}}, \vec{R}_{t_{s3}}\}$, wherein $\vec{R}_{t_s}$ represents a satellite observation position vector, $\vec{L}_{t_s}$ represents an observation angle vector $$\left\lceil \frac{k - \text{Nrate}}{2} \right\rceil \leq s2 \leq \left\lfloor \frac{k - \text{Nrate}}{2} \right\rfloor,$$

$$s1 = \left\lfloor \frac{2*s2 + \text{Nrate} - k + 1}{2} \right\rfloor, \; s3 = \left\lceil \frac{2*s2 + \text{Nrate} - k + 1}{2} \right\rceil.$$

4. The short arc initial orbit determining method according to claim 1, wherein position data and velocity data satisfying any one of conditions $|\vec{r}_{t_s}| < 6378.14$ km or $|\vec{r}_{t_s}| > 42378$ km or $|\vec{v}_{t_s}| > 11.2$ km/s are excluded, wherein $\vec{r}_{t_s}$ represents the target position vector at time point $t_s$, and $\vec{v}_{t_s}$ represents the target velocity vector at the time point $t_s$.

5. The short arc initial orbit determining method according to claim 1, wherein in step S202, a k-means clustering method is used for clustering and Chauvenet's—criterion discriminating method is adopted to eliminate abnormal data.

6. The short arc initial orbit determining method according to claim 1, wherein step S3 comprises the following sub-steps:

S301. performing fitting on the position component vector solution cluster and the velocity component vector solution cluster after noise reduction to construct a state vector combination at various time points;

S302. generating a three-dimensional trajectory solution set of the target orbit according to the state vector combination corresponding to various time points;

S303. projecting the 3D trajectory solution set of the target orbit onto an instantaneous observation image plane according to a measurement status of an observation platform to obtain a 2D trajectory solution set.

7. The short arc initial orbit determining method according to claim 1, wherein step S4 comprises the following sub-steps:

S401. calculating a derivative error and a position error for each two-dimensional trajectory;

wherein the formula for calculating the derivative error of the m-th two-dimensional trajectory is as follows:

$$\Delta uv'^m = \sum_{n=0}^{k} \left[ \left| (2t_n \times \hat{U}'^{\prime m} + \hat{U}'^m) - (2t_n \times U'^* + U'^*) \right| + \left| (2t_n \times \hat{V}'^{\prime m} + \hat{V}'^m) - (2t_n \times V'^* + V'^*) \right| \right]$$

$$\hat{U}^m_{t_n} = \hat{U}'^{\prime m} t_n^2 + \hat{U}'^m t_n + \hat{U}^m_0$$

$$\hat{V}^m_{t_n} = \hat{V}'^{\prime m} t_n^2 + \hat{V}'^m t_n + \hat{V}^m_0$$

$$U^*_{t_n} = U'^{\prime *} t_n^2 + U'^* t_n + U^*_0$$

$$V^*_{t_n} = V'^{\prime *} t_N^2 + V'^* t_n + V^*_0$$

$$\hat{U}_{t_n}{}^m = \hat{U}'^{\prime m} t_n{}^2 + \hat{U}'^m t_n + \hat{U}_0{}^m$$

$$\hat{V}_{t_n}{}^m = \hat{V}'^{\prime m} t_n{}^2 + \hat{V}'^m t_n + \hat{V}_0{}^m$$

$$U_{t_n}{}^* = U'^{\prime *} t_n{}^2 + U'^* t_n + U_0{}^*$$

$$v_{t_n}{}^* = V'^{\prime *} t_n{}^2 + V'^* t_n + V_0{}^*$$

wherein $U''^*$, $V''^*$, $U'^*$, $V'^*$ are quadratic polynomial fitting parameters of the two-dimensional trajectory $\{l^* = (U_{t_n^*}, V_{t_n}^*, t_n, n=0, 1, 2, 3 \ldots k)\}$, $\hat{U}_{t_n}{}^m, \hat{V}_{t_n}{}^m$ is a corresponding image plane coordinates of an estimated trajectory $l_m'$ at a time point $t_n$, m represents the m-th two-dimensional trajectory, and k is the total number of observation time points;

the formula for calculating the position error of the m-th two-dimensional trajectory is as follows:

$$Rt^m = \sum_{n=0}^{k} \frac{D^m_{t_n}}{Dc^m_{t_n}}$$

$$D^m_{t_n} = \sqrt{(\hat{U}^m_{t_n} - U^*_{t_n})^2 + (\hat{V}^m_{t_n} - V^*_{t_n})^2}$$

$$Dc^m_{t_n} = \sqrt{(U^m_c - U^*_{t_n})^2 + (V^m_c - V^*_{t_n})^2}$$

$$D_{t_n}{}^m = \sqrt{(\hat{U}_{t_n}{}^m - U_{t_s}{}^*)^2 + (\hat{V}_{t_n}{}^m - V_{t_s}{}^*)^2}$$

$$Dc_{t_n}{}^m = \sqrt{(U_c{}^m - U_{t_n}{}^*)^2 + (V_c{}^m - V_{t_n}{}^*)^2}$$

wherein, $D_{t_n}{}^m$ is an image plane distance between a predicted value and an observed value, $Dc_{t_n}{}^m$ is the image plane distance between the intersection point of the estimated trajectory and the observed trajectory and the observed point, $t_n$ is the observation time, $\hat{U}_{t_n}^m, \hat{V}_{t_n}^m$ is the corresponding image plane coordinate of the estimated trajectory $l_m'$ at the time point $t_n$, $U_{t_n}^* V_{t_n}^*$ is the corresponding image plane coordinate of the observed trajectory $l^*$ at the time point $t_n$, and $U_c^m V_c^m$ is the image plane coordinate of the intersection point of the estimated trajectory $l_m'$ and the observed trajectory;

S402. taking the derivative error and the position error into comprehensive consideration to select the optimal two-dimensional trajectory, and the number of root of orbit corresponding thereto is used as an optimal estimated value;

S403. outputting the number of root of orbit corresponding to the optimal two-dimensional trajectory, and the determination of the short arc initial orbit is completed.

8. The short arc initial orbit determining method according to claim 7, wherein step S402 is specifically as follows:

for the m-th orbit, the derivative error and position error are sorted from small to large, respectively, and the ranking sequence numbers $Rank_{vel,m}$ and $Rank_{dis,m}$ are obtained, the two sequence numbers are between $1 \sim N_{sv}$, and the sum of the two is calculated as the final error evaluation:

$Rank_m = Rank_{vel,m} + Rank_{dis,m}$ for the final error evaluation, the smallest one $m_{opt}$ is taken as the optimal predicted trajectory.

$$m_{opt} = \arg\min_m \{Rank_m; m = 1, 2, 3 \ldots N_{sv}\}$$

wherein, $N_{sv}$ is the number of orbit root obtained by the combination of the target position and the velocity data corresponding to various time points.

9. A computer-readable storage medium, wherein the computer-readable storage medium stores a computer program, and when the computer program is executed by a processor, the short arc initial orbit determining method claimed in claim 1 is implemented.

10. A computer-readable storage medium, wherein the computer-readable storage medium stores a computer program, and when the computer program is executed by a processor, the short arc initial orbit determining method claimed in claim 2 is implemented.

11. A computer-readable storage medium, wherein the computer-readable storage medium stores a computer program, and when the computer program is executed by a processor, the short arc initial orbit determining method claimed in claim 3 is implemented.

12. A computer-readable storage medium, wherein the computer-readable storage medium stores a computer program, and when the computer program is executed by a processor, the short arc initial orbit determining method claimed in claim 4 is implemented.

13. A computer-readable storage medium, wherein the computer-readable storage medium stores a computer program, and when the computer program is executed by a processor, the short arc initial orbit determining method claimed in claim 5 is implemented.

14. A computer-readable storage medium, wherein the computer-readable storage medium stores a computer program, and when the computer program is executed by a processor, the short arc initial orbit determining method claimed in claim 6 is implemented.

15. A computer-readable storage medium, wherein the computer-readable storage medium stores a computer program, and when the computer program is executed by a processor, the short arc initial orbit determining method claimed in claim 7 is implemented.

16. A computer-readable storage medium, wherein the computer-readable storage medium stores a computer program, and when the computer program is executed by a processor, the short arc initial orbit determining method claimed in claim 8 is implemented.

* * * * *